Oct. 13, 1953     A. E. PEAKE ET AL     2,654,983
TRACTOR MOUNTED WINDROWING ATTACHMENT
Filed Nov. 2, 1948     5 Sheets-Sheet 1
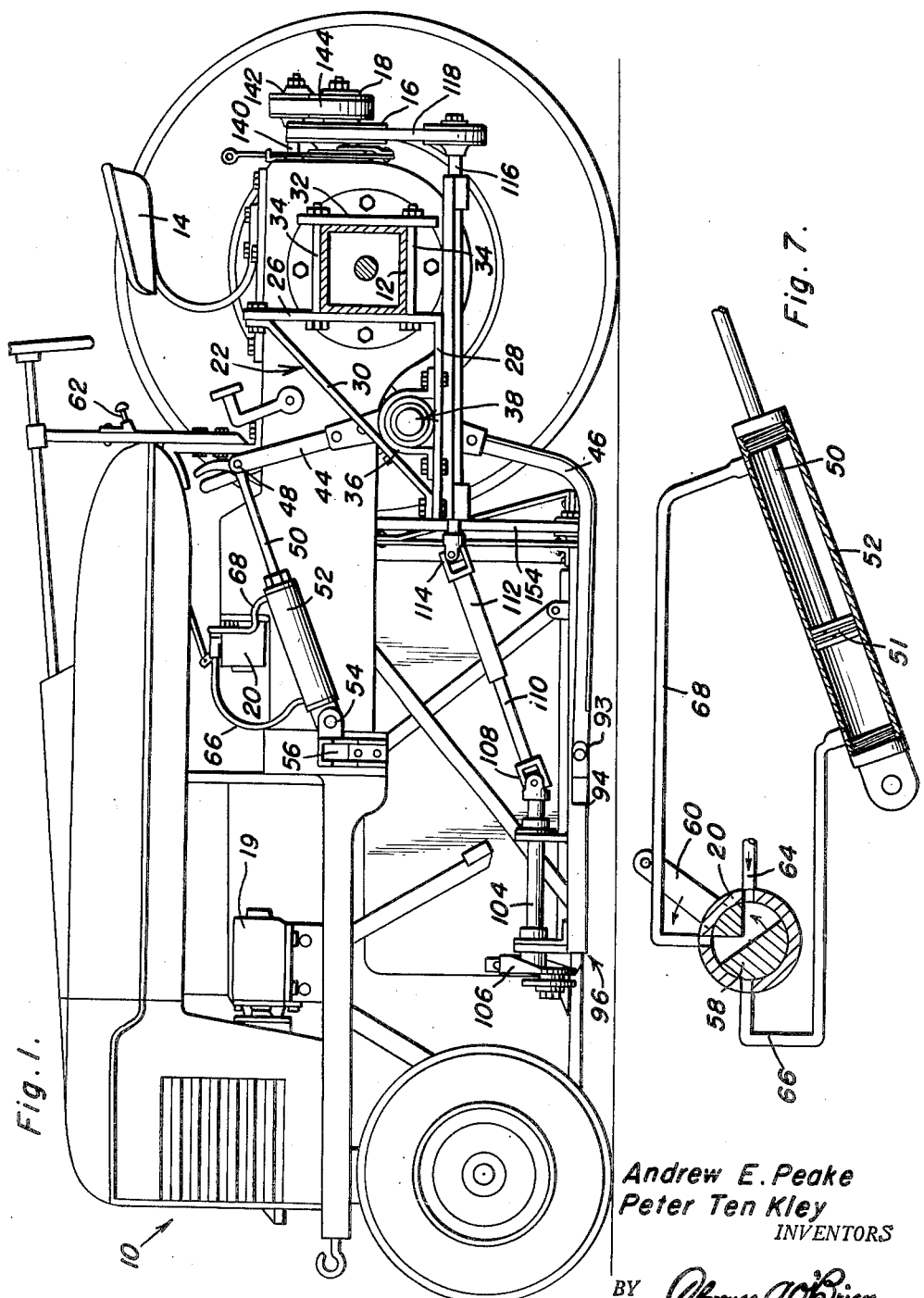
Andrew E. Peake
Peter Ten Kley
INVENTORS

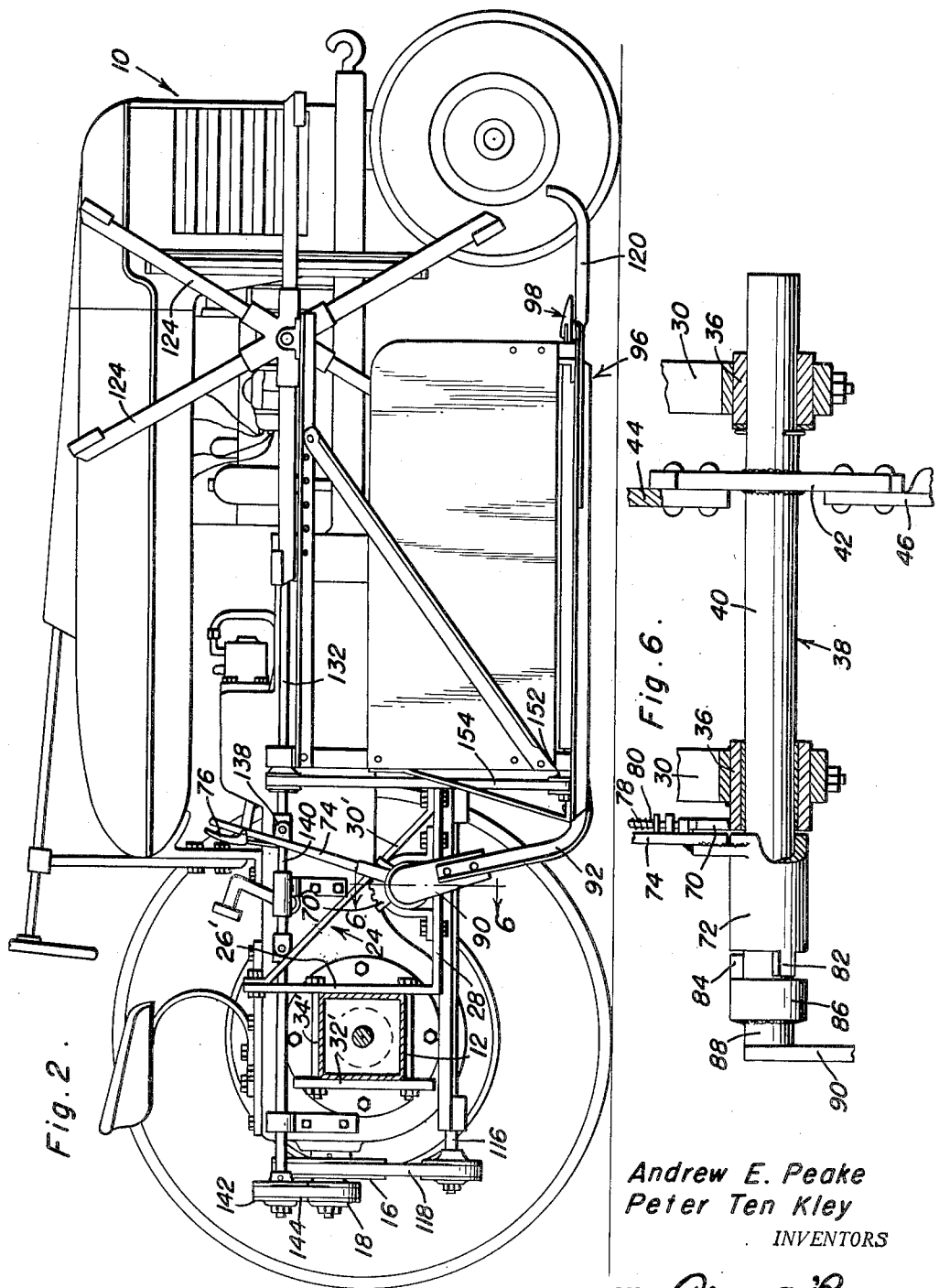

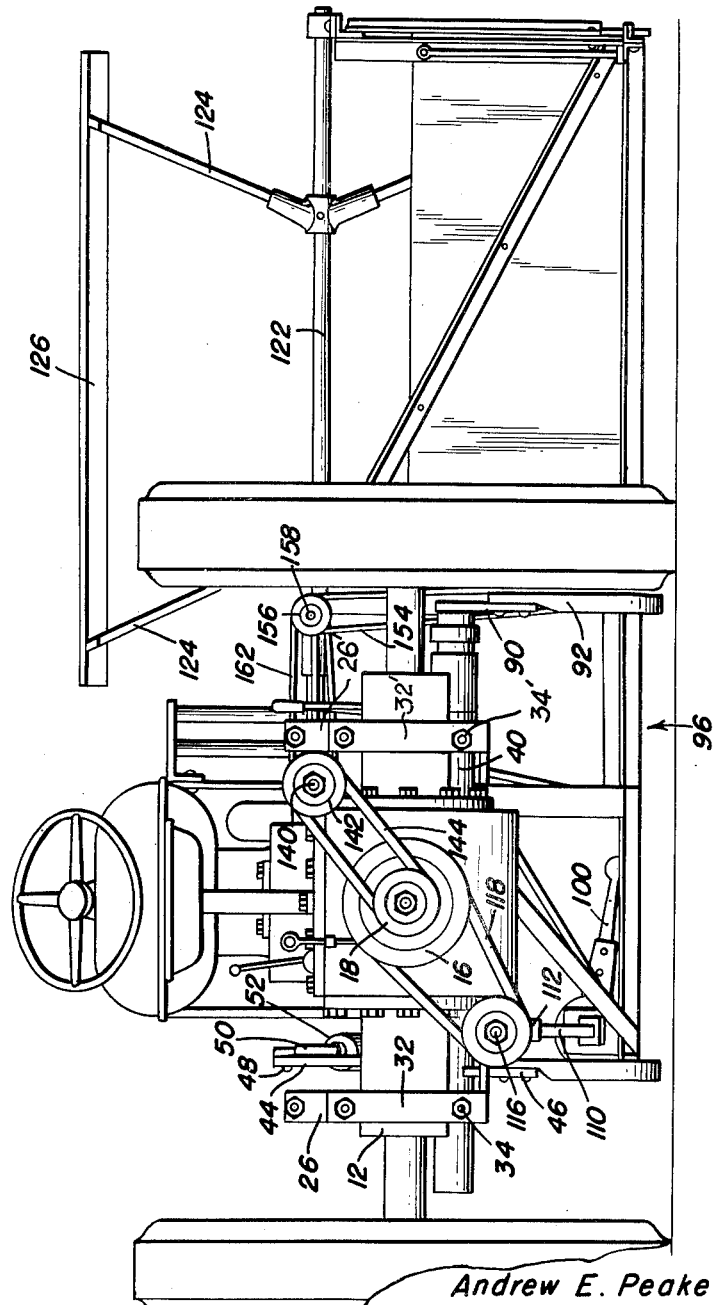

Oct. 13, 1953     A. E. PEAKE ET AL     2,654,983
TRACTOR MOUNTED WINDROWING ATTACHMENT
Filed Nov. 2, 1948     5 Sheets-Sheet 4
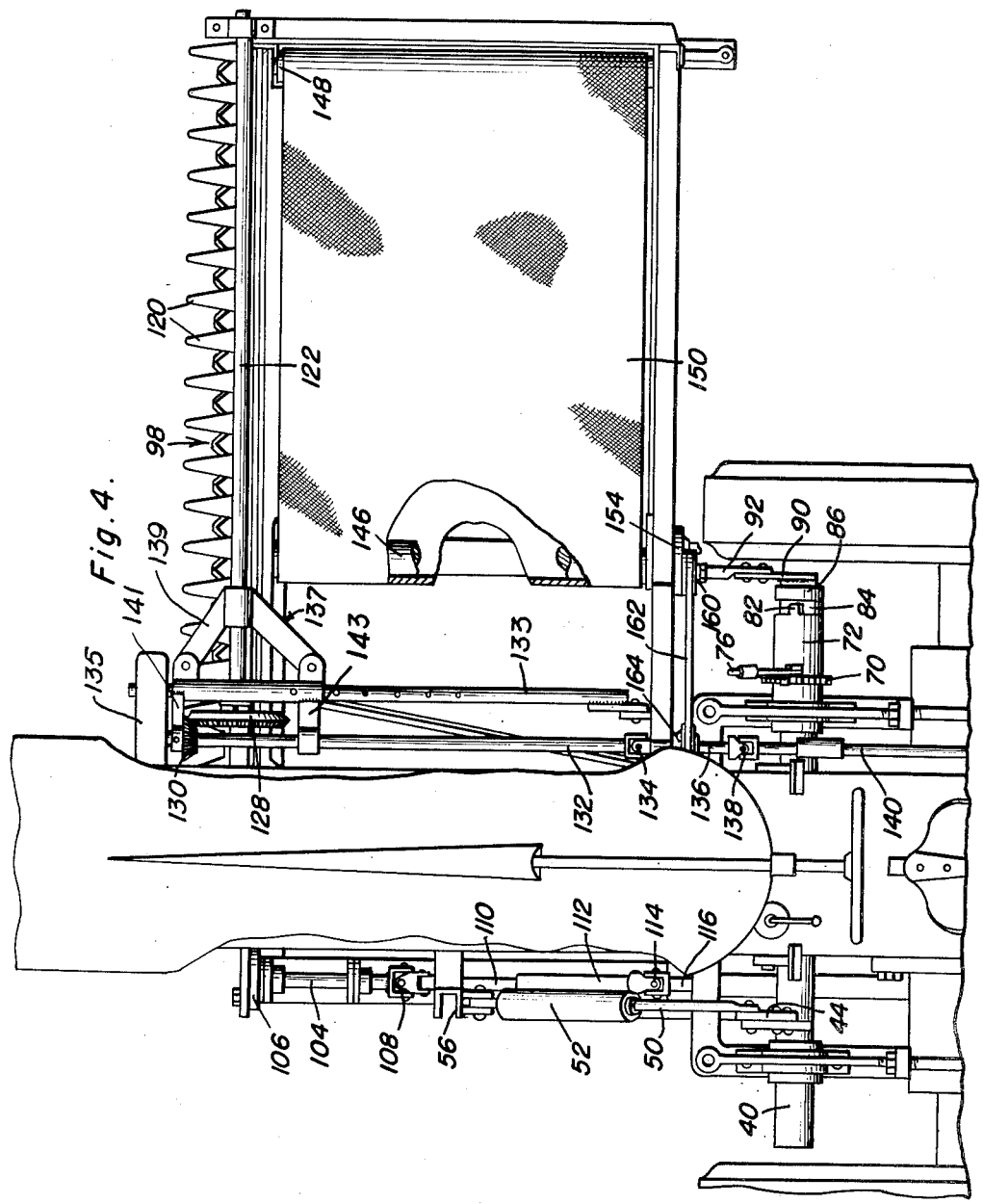
Andrew E. Peake
Peter Ten Kley
INVENTORS

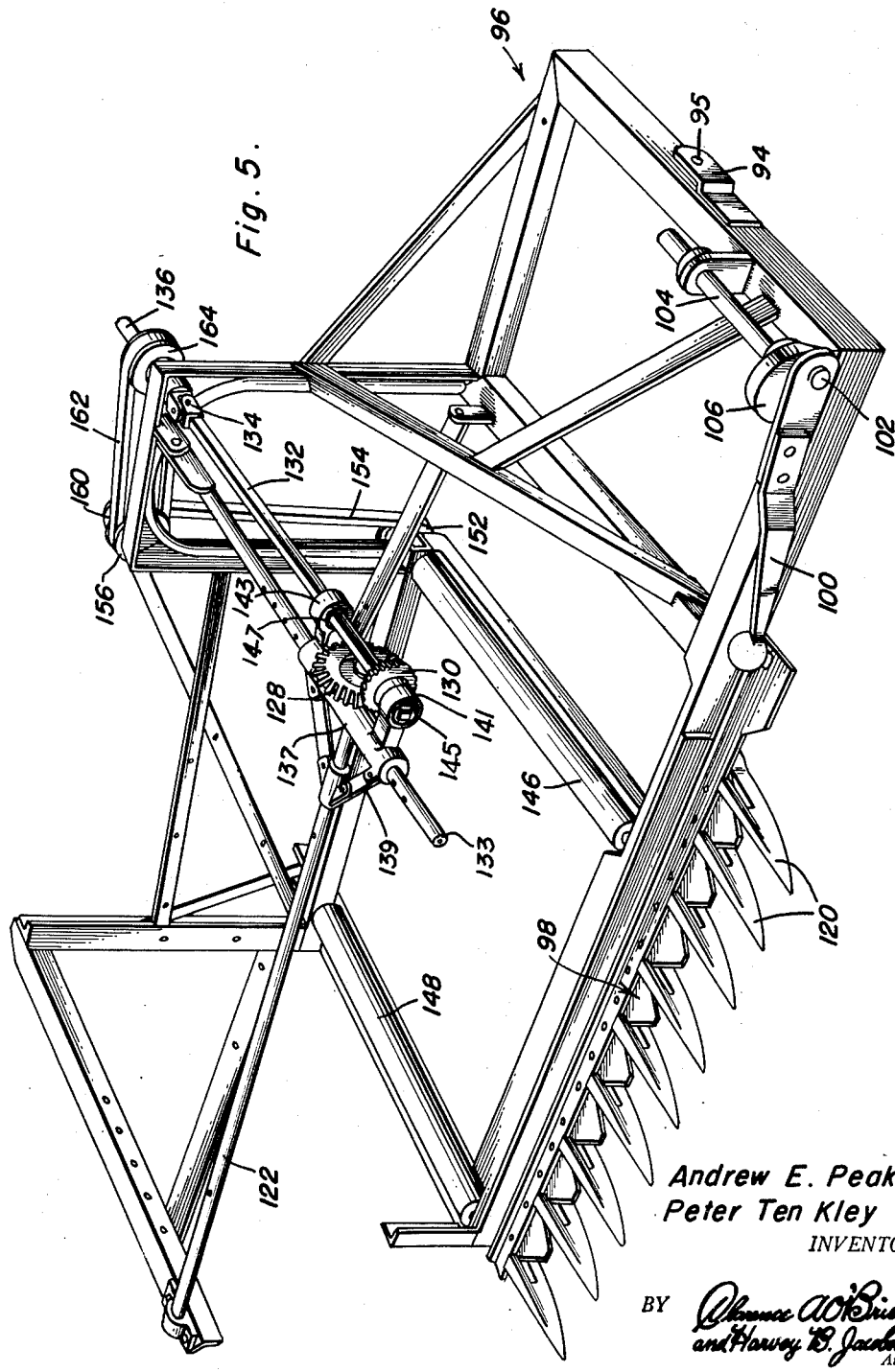

Patented Oct. 13, 1953

2,654,983

UNITED STATES PATENT OFFICE 2,654,983

TRACTOR MOUNTED WINDROWING ATTACHMENT

Andrew E. Peake and Peter Ten Kley, Primghar, Iowa

Application November 2, 1948, Serial No. 57,898

4 Claims. (Cl. 56—23)

This invention comprises novel and useful improvements in a mounted windrower and more specifically pertains to a harvesting and windrowing attachment which may be removably mounted upon and driven by a conventional farm tractor.

The principal object of this invention is to provide a combined harvester and windrower which may be readily mounted upon or removed from a tractor of conventional design, and which may be operated and controlled from the power plant of said tractor.

An important feature of the invention resides in the provision of an attachment for farm tractors of the character set forth hereinbefore, which may be carried by and positioned upon a tractor in advance of the driver's seat thereof, and which will extend laterally from the tractor in full and easy view of the operator of the same.

A still further feature of the invention consists in providing an attachment for farm tractors including a support frame which may be rigidly secured to the axle housings of a tractor on opposite sides thereof, and to which is hinged for vertical pivotal movement a carriage extending transverse and underneath the tractor.

A still further feature of the invention resides in the provision of control means whereby the carriage may be rocked or pivoted vertically upon a transversely extending axle by means of a hydraulic cylinder operated and controlled by the hydraulic power take-off of a tractor, together with manual adjusting means whereby the two ends of the carriage may be angularly adjusted independently of the power operating means for pivotally moving the carriage, to thereby impart an adjusted incline or tilt to the carriage to enable the device to be accommodated to various inclined surfaces and inequalities of the terrain over which the apparatus is employed.

A still further feature of the invention includes the provision of an attachment for tractors having a transversely extending sickle knife for cutting grain, a transversely extending reel mounted above the sickle knife for drawing the grain into the latter, a transversely extending endless conveyor in the rear of the sickle knife for collecting the grain mowed thereby and discharging the same in compact windrows at the side of the machine.

And a final important feature and object of the invention resides in providing an attachment for tractors which may be readily applied to various conventional forms of farm tractors, which may be secured thereto in a readily detachable manner with a minimum of bolts or fastening means, which will afford complete visibility of the attachment and its operation by the driver of the tractor without requiring the operator to turn or crane his head, which may be adjusted and manipulated with a minimum of effort by reason of the power operating controls of the same, and which shall be highly efficient for the purposes intended.

These, together with various ancillary features and objects of the invention which will later become apparent as the following description proceeds, are attained by this device, a preferred embodiment of which has been illustrated by way of example only in the accompanying drawings, wherein:

Figure 1 is a side elevational view of a tractor, taken from the left side thereof, and illustrating the invention applied thereto, the left driving wheel and a portion of the axle and axle housing being removed to show details of construction of the invention;

Figure 2 is a side elevational view from the other side of the tractor, the right driving wheel and a portion of the axle and axle housing being removed to show further details of construction;

Figure 3 is a rear elevational view with parts broken away of the tractor having the invention applied thereto;

Figure 4 is a top plan view of a tractor having the device applied thereto, parts being broken away to show further details of construction;

Figure 5 is a perspective view of the vertically pivoting carriage forming a part of the attachment;

Figure 6 is a vertical transverse sectional detail view on an enlarged scale taken substantially upon the plane of the section line 6—6 of Figure 2, and illustrating the hinge and operating axle of the carriage of the device, parts being broken away and shown in section; and, Figure 7 is an enlarged view, partly in section, showing the hydraulic operating means for pivotally rocking or moving the carriage of the device.

Referring now more specifically to the accompanying drawings, wherein like numerals designate similar parts throughout the various views, there is disclosed a farm tractor of any known and conventional design, to which the attachment forming the subject of this invention has been incorporated. As will be understood, the invention itself may be readily applied to various standard types of farm tractors, it being merely necessary to vary the clamping means by which the attachment is detachably mounted and secured to the tractor, without varying the principles of construction and operation of the invention.

The tractor, indicated generally by the numeral 10 is provided with the customary axle housings 12 which are of substantially square cross section, with the driver's seat 14, with a pair of power take-off pulleys 16 and 18, operated from the power plant 19 of the tractor in any conventional manner, and with a suitable hydraulic power take-off, not shown, and to which is secured the hydraulic control valve casing indicated by the numeral 20.

Referring primarily to Figures 1 and 2, it will be seen that the support frame of the attachment consists of a pair of brackets 22 and 24 disposed at the left and right sides respectively of the tractor, one of these brackets comprising perpendicularly disposed vertical and horizontal members 26 and 28 which are joined by a diagonal brace member 30 to form a triangular bracket, the other of these brackets comprising identical members 26', 28' and 30', respectively. Bracket 22 is removably secured to the side of the wheel axle housing 12 as by a clamping plate 32 and bolts 34 and bracket 24 is similarly secured by clamping plate 32' and bolts 34'. By this means, the pair of brackets are removably but rigidly clamped and secured to the axle housings 12 on the front side thereof and at opposite sides of the body of the tractor frame.

Journalled between and upon the two horizontal members 28 and 28', respectively of the support brackets, as by bearings 36 and 36', respectively, is a transverse rock shaft indicated generally by the numeral 38 which constitutes an axle extending beneath the body of the tractor and upon which is pivotally mounted a vertically rockable carriage supporting the various elements of the attachments.

As shown more clearly in Figures 3, 4 and 6, the axle 38 includes a rockable shaft 40 which adjacent one end has welded or otherwise rigidly secured thereto a lever 42 to whose opposite ends are bolted or otherwise rigidly secured an actuating lever 44 and a lift lever 46. The actuating lever 44, as shown in Figure 1, is pivotally connected as at 48 to a piston rod 50 which is provided with a piston 51, see Figure 7, slidably received in a hydraulic cylinder 52 which is pivotally mounted as at 54 upon a bracket 56 carried by any suitable part of the framework of the tractor 10.

As shown in Figure 7, the control valve casing 20 is provided with a suitable oscillating or rotary valve plug 58 therein which is provided with an operating lever 60 which may be controlled from the dash of the tractor as by a push rod 62. This valve which may be of any conventional design is intended to selectively control the flow of the hydraulic pressure fluid from the hydraulic power take-off of a tractor, and which is delivered to the valve casing by a hydraulic inlet and return conduit 64, and from thence selectively passes by fluid conduits 66 and 68 to the opposite ends of the hydraulic cylinder 52 to opposite sides of the piston 51, for selectively urging the piston in either direction as desired, to thereby through the associated linkage, cause a rocking movement of the shaft 40 of the axle 38.

As shown in Figures 1 and 6, one of the bearings 36 of the axle 38 has rigidly secured thereto a toothed quadrant or sector plate 70. An adjusting sleeve 72 is rotatably mounted upon the other end of the shaft 40 from the end which carries the lever 42, and has rigidly secured thereto a hand lever 74 provided with a hand grip portion 76 for operating the detent rod 78 which is urged as by a spring 80 into downward position for engaging the end of the detent rod 78 with selected teeth of the quadrant 70. Thus, it will be evident that the sleeve may be rotated upon the shaft 40 and secured in various angularly adjusted positions by means of the sector plate or quadrant 70 and the above mentioned ratchet teeth. At its other end, the sleeve 72 is provided with a longitudinally extending lug or shoulder 82 which is adapted to form an abutting stop for a similar shoulder 84 extending inwardly from a collar 86 rigidly carried by a stub axle shaft section 88 which extends into and is journalled in the sleeve 72, in alignment with the shaft 40. At its outer end, the section 88 has a rigidly attached lifting lever 90, which thus is angularly adjustable relative to the lift lever 46 and is independently rotatable or oscillatable with respect thereto for a purpose and in a manner to be subsequently set forth.

A substantially L-shaped lift lever or arm 92 is rigidly attached to the arm 90 shown in Figure 2. The pair of lift arms 46 and 92 thus vertically pivot the carriage under the control of the hydraulic actuator 52 of the axle 38 and the ends of the carriage may be relatively inclined by the lever 74 and its associated mechanism.

The outer extremities of the lift arms 92 and 46 are pivotally connected to brackets 94 by means of bolts or pins 93 (Figure 1) extending through apertures 95 (Figure 5) of brackets 94, one of which brackets is shown in Figure 5, secured to the pivotally rocking carriage of the attachment, indicated generally by the numeral 96. This carriage includes a suitable framework construction, which at its front end is provided with a sickle knife construction indicated generally by the numeral 98 and which may be of known and conventional design, and which thus extends laterally from the side of the tractor and in front of the driver's seat.

For operating the reciprocating blade of the sickle knife, a pitman 100 is connected thereto in any suitable manner, and is journalled to a crank pin 102, secured to an operating shaft 104, suitably journalled upon the framework of the carriage, and which is further provided with a counter-balance 106 of any known design.

As shown in Figure 1, this shaft 104 is connected as by a universal joint 108 and telescoping, longitudinal extensible but non-rotatable shaft members 110 and 112, and a second universal joint 114, with a driving shaft 116 suitably journalled beneath the support frame 22 and 24, and connected as by a pulley and belt drive 118 with the power take-off pulley 16 of the tractor. Thus, the sickle knife is operated directly from the power take-off of the tractor and by means of the telescoping shaft section 110 and 112, and the universal joint connections 108 and 114, the sickle knife is able to operate despite pivotal adjustment of the carriage and consequently of the sickle knife.

Extending forwardly of the front portion of the carriage 96, are suitable shoes or runners 120, which as is customary in sickle knives, prevent the blades from digging into the ground, and raise or lower the sickle knives to conform to inequalities in the terrain over which the knife travels.

Further journalled upon the framework 96 of the carriage is a transversely extending shaft 122 upon which is mounted a reel having arms 124 and blades 126, see Figure 3. The shaft 122 and the reel are thus mounted on the forward end of the carriage, and above the sickle knives, whereby the reel during its rotation will serve to draw the standing grain against the sickle knives for cutting thereby. As shown in Figures 4 and 5, the shaft 122 is provided with a gear 128 which is inmesh with a bevel gear 130 carried by a driving shaft 132 which is of square cross section and is thus longitudinally slidable and splined in the hub of the gear 130, the forward end of the shaft being connected as by universal joint 134 with a power shaft 136 which is again connected by a universal joint 138 with a driving shaft 140 which as shown in Figures 2 and 3 is provided with a pulley 142 connected by a belt 144 with the above mentioned tractor power take-off pulley 18. Thus, the reel is independently and directly driven by the power take-off of the tractor, and is not affected in its operation by the raising or lowering or pivotal movement of the carriage.

To rigidly interconnect shafts 132 and 122 and support the same, an elongated support bar 133 is provided which is secured at one end to the frame of carriage 96. The support bar 133 extends parallel to shaft 132 and has its other end connected to the tractor 10 as by bracket 135 (Figure 4.). A sleeved bracket 137 is mounted on the support bar 133 and includes a yoke 139 secured to shaft 122. A pair of aligned bearing sleeves 141 and 143 extend from the sleeve of bracket 137 and bearings 145 and 147 having square bores therein journal the square shaft 132 for rotation in the bearing sleeves 141 and 143. The bearing sleeve and bearing construction for rotatably mounting polygonal shaped shafts is conventional as shown in Patent No. 2,290,074, issued to E. A. Santon on July 14, 1942.

As shown more clearly in Figures 4 and 5, the carriage 96 is provided with a pair of spaced rolls 146 and 148 which extend between the front and rear edges of the carriage and over which is entrained a canvas belt 150 or other suitable endless conveyor. This conveyor is disposed immediately to the rear of the sickle knives and in a position for receiving the grain cut thereby, and is rotated in such a direction as to cause the grain falling upon the endless conveyor to be delivered and discharged outwardly from the tractor into a compact windrow whereby the same may be readily picked up by a pick-up device of a combine for threshing or the like.

For operating the endless conveyor, the roll 146 is provided with a pulley 152, and a flexible belt 154 is entrained over the pulley 152 and over a similar pulley 156, see Figure 3, which is journalled upon a stub axle 158 suitably mounted upon the carriage 96. A further pulley 160 on this stub axle is connected as by a belt 162 with a driving pulley 164 mounted upon the power shaft 136. Thus, the conveyor and the reel are simultaneously operated by means of the shaft 136 from the power take-off pulley 18 of the tractor.

From the foregoing, it is felt that the construction and operation of the device will now be readily understood. The power take-off pulley 16 and 18 of the tractor are operated through the usual control clutches or other control mechanism, and from these pulleys the sickle knives, and the reel and endless conveyor are actuated. It will be noticed that the shoes or runners 120 of the carriage will follow the contour of the ground, and thereby raise or lower the outer end of the laterally extending carriage and the mechanism carried thereby. This tilting of the carriage is permitted since the carriage is pivotally supported by the two lift arms or levers 46 and 92, and as set forth hereinbefore these arms are independently movable upon the axle 38. Thus, the carriage is able to incline or tilt in accordance with inequalities of the ground and to permit the carriage passing over any obstructions encountered upon travelling over the terrain.

It will be noted that this relative tilting of the carriage is effected by reason of the lost motion connection which may occur between the shoulders 82 and 84.

Further, by suitable manipulation of the control valve lever 60, the hydraulic cylinder 52 and piston 51 may be suitably energized to cause a rocking of the axle 38, by means of pivotal movement of the arm 44, and this rocking movement will positively lift the lift arm 46, and the lift arm 92. However, the shoulder 82 on lug of the sleeve 72 may be adjusted by means of the sector plate 70 and the detent rod 78 mounted upon the sleeve 72, to so position the lug as to provide the adjustable stop for engagement by the shoulder 84 upon the shaft extension 88, to thereby provide an adjustable stop for limiting the lowering movement of the arm 92. It will thus be seen that by suitably adjusting the hand lever 74, the downward pivoting movement of the lift arm 92 may be regulated or adjusted, whereby the carriage and the sickle knives carried thereby may be adjusted at various angular inclinations as desired to accommodate the device to various degrees of slopes over which the machine travels.

From the foregoing, the obvious advantages of the construction and operation of this device will be readily understood and further explanation is believed to be unnecessary.

Since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. In a harvester attachment for a tractor, a support frame, attaching means connected to said support frame for mounting the same on a tractor, a carriage extending laterally from said support frame and being hinged thereto for vertical pivoting movement, a sickle knife mounted on the front of said carriage and being laterally offset from said support frame, a reel mounted on said carriage parallel to and spaced above said sickle knife, spaced parallel rollers mounted on said carriage to the rear of said sickle knife and being angularly related thereto, an endless conveyor belt entrained over said rollers for windrowing grain cut by the sickle knife, operating means mounted on said carriage and support frame effecting pivoting of said carriage and operation of said reel and said sickle knife, said support frame including spaced brackets, a rock shaft journaled on an extending between said brackets, lift levers rigidly secured to said rock shaft at opposite ends thereof, said carriage being pivotally connected to said lift levers whereby the carriage may be vertically pivoted by movement of the rock shaft.

2. The combination of claim 1 wherein said rock shaft includes an actuating lever secured to one end, a hydraulic cylinder connected to said actuating lever and rocking said rock shaft and hydraulic control means connected to said hydraulic cylinder.

3. The combination of claim 2 including an angularly adjustable connection mounted intermediate the ends of said rock shaft and manual means interconnected with said adjustable connection for adjustably varying the angular relation of the lift levers.

4. The combination of claim 3 including a lost motion connection in said adjustable connection whereby the outer end of the carriage and its associated lift lever are free to pivot vertically about the rock shaft independently of the inner end of the carriage to compensate for inequalities of the surface over which the carriage travels.

ANDREW E. PEAKE.
PETER TEN KLEY.

References Cited in the file of this patent

UNITED STATES PATENTS

| Number | Name | Date |
|---|---|---|
| 801,498 | Wyman | Oct. 10, 1905 |
| 968,878 | McLaughlin | Aug. 30, 1910 |
| 1,728,150 | Christiansen | Sept. 10, 1929 |
| 2,071,844 | Korsmo et al. | Feb. 23, 1937 |
| 2,292,958 | Millard et al. | Aug. 11, 1942 |
| 2,304,421 | Rogers | Dec. 8, 1942 |
| 2,375,848 | Hume | May 15, 1945 |
| 2,455,122 | Hansen et al. | Nov. 30, 1948 |
| 2,487,144 | Kreideman | Nov. 8, 1949 |
| 2,488,592 | Hamilton et al. | Nov. 22, 1949 |
| 2,501,424 | Ufer | Mar. 21, 1950 |
| 2,530,668 | Tallman | Nov. 21, 1950 |
| 2,532,164 | Hansen et al. | Nov. 28, 1950 |